United States Patent [19]

Lorenz

[11] Patent Number: 4,895,281
[45] Date of Patent: Jan. 23, 1990

[54] ROTARY CLOSURE FOR A VESSEL

[75] Inventor: Horst Lorenz, Solingen, Fed. Rep. of Germany

[73] Assignee: Robert Krups Stiftung & Co. KG., Solingen, Fed. Rep. of Germany

[21] Appl. No.: 234,963

[22] Filed: Aug. 22, 1988

[30] Foreign Application Priority Data

Sep. 11, 1987 [DE] Fed. Rep. of Germany ....... 3730540

[51] Int. Cl.⁴ .............................................. A47G 19/14
[52] U.S. Cl. .................................. 222/465.1; 222/519; 222/549; 222/564
[58] Field of Search ............ 222/549, 519, 131, 465.1, 222/468, 183, 564; 220/293, 300, 301; 215/13.1, 332

[56] References Cited

U.S. PATENT DOCUMENTS

| | | | |
|---|---|---|---|
| 2,599,332 | 6/1952 | Kirman | 222/131 |
| 3,189,229 | 6/1965 | Carroll et al. | 222/465.1 X |
| 3,776,433 | 12/1973 | DeTreitas | 222/579 |
| 4,583,653 | 4/1986 | Minsky | 220/293 X |
| 4,625,884 | 12/1986 | Zimmermann | 222/519 X |

FOREIGN PATENT DOCUMENTS 3603528 7/1987 Fed. Rep. of Germany ...... 222/131
1339005 11/1973 United Kingdom ................ 222/519

Primary Examiner—F. J. Bartuska
Assistant Examiner—Gregory L. Huson
Attorney, Agent, or Firm—Peter K. Kontler

[57] ABSTRACT

A vacuum bottle wherein the housing of the insulating jacket has a top section with a circular opening for the extension of a cover which overlies the opening and can be rotated to move one of two apertures in a downwardly extending skirt of the extension into register with a passage at the inlet end of a spout. The cover is separably coupled to the top section of the housing by a bayonet mount which causes the cover to rise during rotation to a pouring position and to descend during rotation to a sealing position. The jacket confines a receptacle for a hot or cold beverage which can be dispensed by way of the spout in the pouring position of the cover.

33 Claims, 3 Drawing Sheets

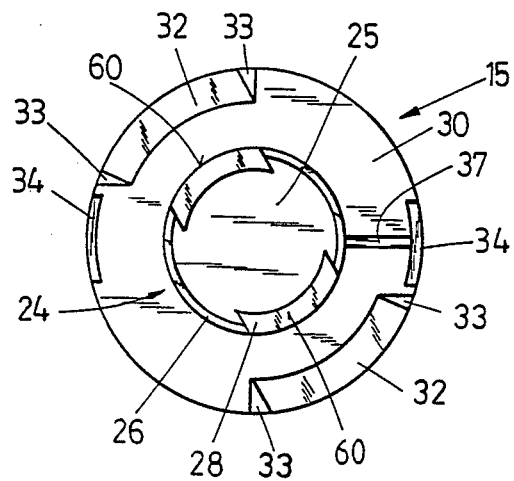
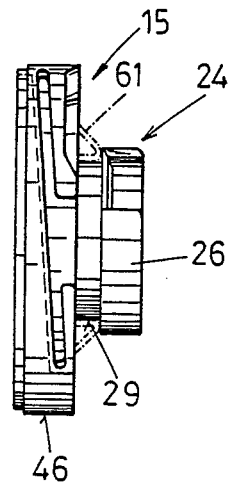
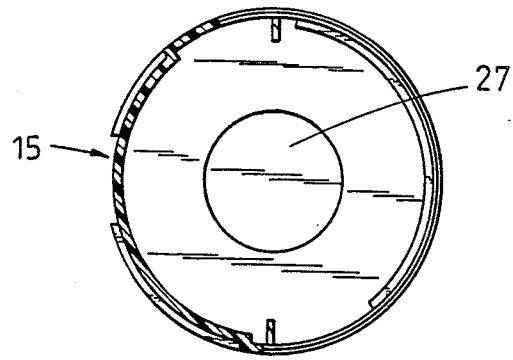
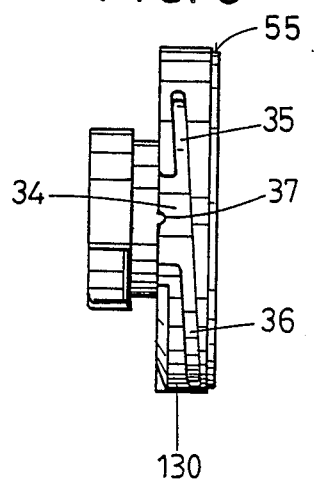
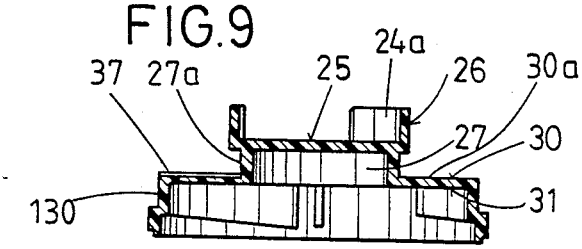

ROTARY CLOSURE FOR A VESSEL

BACKGROUND OF THE INVENTION

The invention relates to improvements in vessels for hot or cold beverages, especially to vacuum bottles. More particularly, the invention relates to vessels of the type wherein the top section of the housing is provided with a spout and has an opening for reception of a cover or lid which must be removed when the internal compartment of the housing is to receive a fresh supply of liquid, such as hot coffee, hot water which is to contact tea leaves, iced coffee or others.

Vessels of the above outlined character are well known. As a rule, the cover is separably connected to the top section of the housing by a bayonet mount and can be rotated to and from a pouring position in which it permits a stream of confined liquid to flow into the spout, and to and from a sealing position in which the path for the flow of liquid into the spout is sealed. The inner side (underside) of the cover is either flat or is provided with a shallow cavity. This establishes a sickle-shaped path for the flow of liquid into the spout in the pouring position of the cover; the path is defined in part by the cover and in part by the top section of the housing. Such covers are quite satisfactory when the diameter of the vessel is relatively small and as long as the person in charge of dispensing liquid from the vessel gradually tilts the housing to ensure a predictable flow of liquid into the spout. However, presently known covers are much less satisfactory for controlled dispensing of liquids from large-diameter vessels and if the user abruptly tilts the housing by way of the customary handle so as to cause a large body of liquid to strike the underside of the cover while the latter is maintained in the pouring position. Such manipulation of a large-diameter vessel will not result in predictable pouring of the liquid; instead, the liquid will splash beyond the sidewalls of the spout and onto the adjacent portions of the top section of the housing.

OBJECTS OF THE INVENTION

An object of the invention is to provide a novel and improved vessel, particularly a vacuum bottle, which is constructed in such a way that it ensures predictable dispensing of the confined liquid irrespective of the diameter of the housing.

Another object of the invention is to provide a novel and improved cover or lid for use with the housing of the improved vacuum bottle.

A further object of the invention is to provide a vessel for confinement and controlled dispensing of cold or hot beverages which can be mass-produced at a reasonable cost.

An additional object of the invention is to provide a vessel which is designed to reliably ensure that the confined liquid can be dispensed solely by way of the spout.

Still another object of the invention is to provide the cover and the top section of the housing of the vessel with novel and improved means for separably securing the cover to the housing for movement between pouring and sealing positions.

SUMMARY OF THE INVENTION

The invention is embodied in a vessel for hot or cold beverages, particularly in a vacuum bottle. The vessel comprises a housing which defines a liquid-receiving compartment and has a bottom wall beneath and a top section above the compartment. The top section has an opening which communicates with the compartment and a spout, and the vessel further comprises a cover or lid which overlies the opening and has an extension in the opening. The extension has an internal space which communicates with the compartment and at least one lateral liquid-evacuating aperture which communicates with the internal space. The extension is rotatable in the opening of the top section between a pouring position in which the aperture establishes a path for the flow of liquid from the compartment into the spout and a second position in which the extension seals the spout from the compartment. The extension is preferably open at its underside, i.e., at the side which faces the bottom wall of the housing, and the vessel further comprises means (preferably a bayonet mount) for releasably and rotatably coupling the cover to the top section of the housing.

The extension comprises a top wall which is disposed above the internal space and a skirt which surrounds the internal space. The aperture or apertures are provided in the skirt. The top wall can be provided with a ramp adjacent each aperture of the skirt. A substantially washer-like portion or second wall of the cover (such washer-like portion is spaced apart from and is disposed above the top wall of the extension) can be provided with one or more second ramps each aligned with and each disposed radially outwardly of a ramp of the top wall. Each second ramp is preferably flanked by two cam faces which merge gradually into a flat surface provided on the washer-like portion of the cover and facing the extension.

The skirt of the extension is preferably formed with two apertures which are of identical size and shape and are preferably disposed diametrically opposite each other with respect to the axis of rotation of the extension.

The cover can be provided with an external circumferential groove which is adjacent and is disposed above the top wall of the extension, and with an annular sealing element which is disposed in the groove and engages the top section of the housing in the second position of the extension.

The aforementioned surface of the second wall or washer-like portion of the cover can be provided with an aerating groove or channel which can extend substantially radially of the extension.

In accordance with a presently preferred embodiment, the cover comprises a lower part which includes the extension and an upper part which is rigid with the lower part and is accessible above the top section of the housing to facilitate rotation of the cover. The lower part of the cover can further comprise two annular projections (e.g., two circumferentially complete ribs). One of these projections surrounds and the other projection is surrounded by a cylindrical portion which is an integral component of the upper part of the cover and is disposed above the extension. The cylindrical portion can be bonded (e.g., ultrasonically welded) to the lower part of the cover.

The upper part of the cover can include a centrally located upwardly extending dome-shaped portion which can be rotated by hand to thereby rotate the extension in the opening of the top section of the housing.

The upper part of the cover preferably constitutes a one-piece body which can include an annular flange surrounding the dome-shaped portion, and an intermediate portion connecting the flange with the dome-shaped portion. A rim of the flange is remote from the intermediate portion and abuts shoulders which are provided on the sidewalls of the spout. The sidewalls of the spout preferably converge in a direction radially of and away from the extension, and such sidewalls define an outlet for the outflow of liquid from the spout.

The top section of the housing preferably comprises an annular first wall which surrounds the opening, an upwardly and outwardly flaring second wall which is adjacent and is disposed above the first wall, and a substantially cylindrical third wall adjacent and disposed above the second wall. The bayonet mount preferably comprises two male coupling elements which are provided on the third wall of the top section and are preferably disposed diametrically opposite each other. Such male coupling elements can constitute elongated protuberances which are inclined to the horizontal.

The top section of the housing can further comprise a fourth wall which is adjacent and slopes upwardly and outwardly from the upper end of the third wall. Such fourth wall is provided with a passage which is adjacent the spout and communicates with the aperture of the extension when the latter assumes the pouring position. The aforementioned flange of the upper part of the cover overlies the fourth wall of the top section and is spaced apart from the fourth wall in the pouring position of the extension so that the liquid can flow from the aperture into the passage in response to tilting of the housing so as to move the spout to a lower level.

The aforementioned cylindrical portion of the lower part of the cover has a peripheral surface which is provided with one or two female coupling elements, one for each male coupling element of the bayonet mount. Each female coupling element comprises an inlet for the respective male coupling element and first and second grooves which are inclined to the horizontal and communicate with the respective inlet. The first groove of each female coupling element is preferably shorter than the respective second groove; the male coupling elements are received in one of the respective grooves in the pouring position and in the other of the respective grooves in the second position of the extension. The one groove of each female coupling element can extend circumferentially of the extension and clockwise from the respective inlet along an arc of approximately 40 degrees, and the other groove of each female coupling element can extend along an arc of approximately 70 degrees counterclockwise from the respective inlet.

The housing of the vessel further includes a main portion between the bottom wall and the top section, and a handle which is outwardly adjacent the main portion and includes a substantially horizontal upper portion, a substantially horizontal lower portion, and a substantially vertical portion between the upper and lower portions. The vertical portion of the handle is preferably provided with a cavity which has an open lower end. The cross-sectional area of the cavity preferably decreases in a direction from the open lower end toward the upper portion of the handle. The vertical portion of the handle can be provided with an inclined first facet above the cavity, and the upper portion of the handle is preferably provided with a second facet which is inclined relative to and is integral with the first facet.

The top section of the housing can be provided with a channel for the cord or string of a tea bag which extends into the compartment. The channel can be provided in the upper side of the aforementioned fourth wall of the top section of the housing. The handle is preferably disposed diametrically opposite the spout and its upper portion is adjacent the channel.

The novel features which are considered as characteristic of the invention are set forth in particular in the appended claims. The improved vacuum bottle itself, however, both as to its construction and the mode of using the same, together with additional features and advantages thereof, will be best understood upon perusal of the following detailed description of certain specific embodiments with reference to the accompanying drawing.

BRIEF DESCRIPTION OF THE DRAWING

FIG. 5 is a bottom plan view of the lower part of the cover;

FIG. 6 is a first side elevational view of the lower part of the cover;

FIG. 7 is a top plan view of the lower part of the cover, with the left-hand portion shown in a sectional view;

FIG. 8 is a different second side elevational view of the lower part of the cover;

FIG. 9 is a central sectional view of the lower part of the cover;

DESCRIPTION OF PREFERRED EMBODIMENTS

Figure 1:
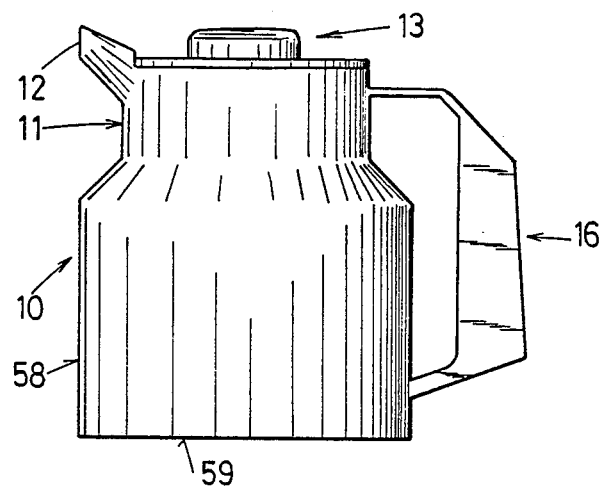
FIG. 1 is an elevational view of a vacuum bottle which embodies the invention.

The drawing shows only those components of the improved vessel 10 (hereinafter called vacuum bottle or carafe) which are necessary for full understanding of the invention. Thus, the drawing (see particularly FIG. 10) does not show the receptacle which is removably installed in the jacket and is to receive a hot or cold beverage (such as hot or iced coffee or tea) whose temperature should be maintained at or close to an optimum value for extended periods of time (for example, several hours). The receptacle can be inserted into or removed from the main portion 58a of the housing 58 of the illustrated jacket of the carafe 10 upon removal of a bottom wall 59 which is shown schematically in FIG. 1 but is omitted in FIG. 10. The receptacle and/or any other constituents of the improved carafe 10 which are not specifically shown in the drawing can be identical with or similar to those used in available vacuum bottles, e.g., in insulated carafes Nos. 278 and 279 which are manufactured and distributed by the assignee of the present application.

The improved carafe 10 comprises the jacket including the housing 58 which can be made of a metallic and/or plastic material, a spout 12 and the bottom wall 59, and a cover or lid 13 which is releasably and rotatably coupled to a top section 11 of the housing 58. The top section 11 includes the spout 12 and is integral with the substantially horizontal upper portion 48 of a handle 16. The carafe 10 further comprises the aforementioned receptacle which can be inserted into or removed from the housing 58 following detachment of the bottom wall 59 which has an external thread movable into mesh with the internal thread 53 in the lower part of the main portion 58a of the housing 58 (see FIG. 10). The housing 58 includes the top section 11 which is disposed beneath the spout 12 and merges into the substantially cylindrical major or main portion 58a of the housing 58. The handle 16 is preferably integral with the housing 58 and is disposed opposite the spout 12. The internal compartment 54 of the housing 58 serves to receive the aforementioned receptacle. The latter can be made of glass or another suitable cold- or heat-resistant light-transmitting material which can be readily cleaned and can stand the developing thermal and/or other stresses.

Figure 2:
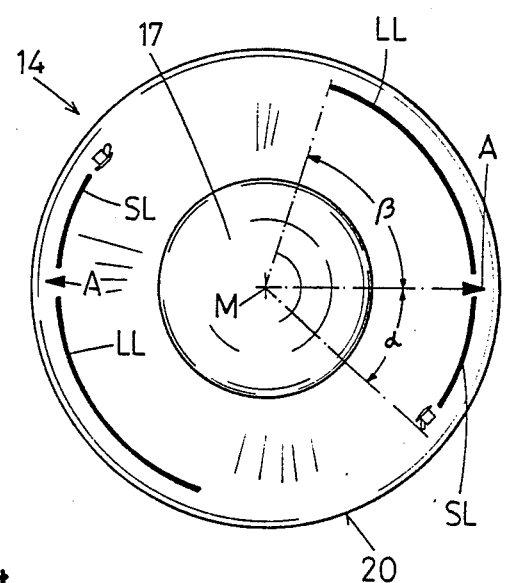
FIG. 2 is an enlarged plan view of the cover of the vacuum bottle of FIG. 1.

The top section 11 of the housing 58 of the jacket has a round opening 38 (FIGS. 10 and 11) for admission of a beverage into or for evacuation of beverage from the receptacle in the compartment 54. The opening 38 is normally sealed, at least in part, by the cover or lid 13. This cover includes an upper part 14 and a lower part 15. The upper part 14 is shown in detail in FIGS. 2, 3 and 4, and the lower part 15 is shown in FIGS. 5 through 9. The upper part 14 is preferably made of a single piece of suitable plastic material and includes a substantially dome-shaped centrally located raised hollow top portion 17 which resembles an inverted cup and can be used as a handgrip means for manipulation of the cover 13, namely for insertion of the cover 13 into the opening 38, for rotation of the cover in the opening 38, and for lifting of the cover out of the opening. The lower marginal zone of the top portion 17 merges into a concavo-convex intermediate portion 18 which is a circumferentially complete annulus and merges, in turn, into an outwardly and slightly upwardly flaring annular flange 19 of the top portion 14. The reference character 20 denotes the rim of the flange 19.

The top portion 15 has a circular outline, and its center M coincides with the center of the entire upper part 14. The upper side of the flange 19 of the upper part 14 is provided with indicia or markers including two arrowheads A which are disposed diametrically opposite each other (see FIG. 2) and facilitate proper insertion and convenient detachment of the cover 13 from the top section 11 of the housing 58 of the jacket. When the cover 13 is to be attached to or detached from the housing 58, one of the arrowheads A is adjacent and points toward the spout 12 to thus indicate that the cover is ready for turning relative to the top section 11 to a position in which it is properly coupled to the housing 58 or is ready to be lifted out of the opening 38. Each arrowhead A is flanked by two arcuate lines or markers including a shorter line SL which extends along a shorter arc (note the angle alpha) and a longer line LL which extends along a longer arc (note the angle beta). That end of each shorter line SL which is remote from the respective arrowhead A is adjacent a symbol which resembles a cup. When the top part 14 of the cover 13 is turned from the position of FIG. 2 in a counterclockwise direction (so that the symbols denoting the cups take the place of the respective arrowheads A), the cover 13 assumes a pouring (topmost or raised) position in which it permits a beverage to flow from the receptacle in the compartment 54 into the spout 12 at a maximum rate. The opening 38 of the jacket is completely sealed from the surrounding atmosphere when the upper part 14 of the cover 13 is turned clockwise (as viewed in FIG. 2) so that the free end of each longer line LL takes the place of the respective arrowhead A. The cover 13 then occupies a second (lowermost or sealing) position. In the embodiment which is shown in FIGS. 1 to 11, the angle alpha equals or approximates 40 degrees, preferably 41 degrees, and the angle beta equals or approximates 70 degrees, preferably 72 degrees.

Figure 3:
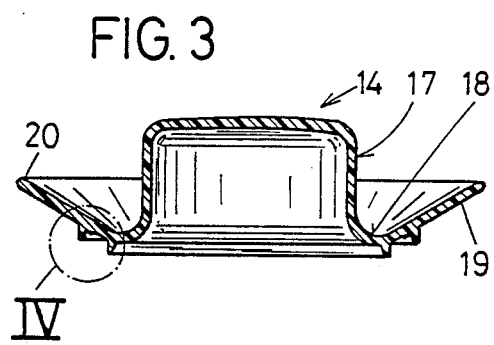
FIG. 3 is a smaller-scale central sectional view of the top part of the cover.
Figure 4:
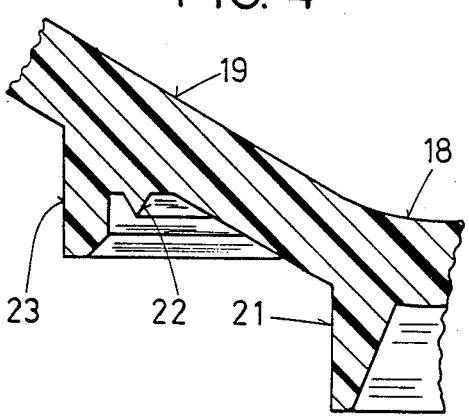
FIG. 4 is an enlarged view of a detail within the phantom-line circle IV in FIG. 3.

FIGS. 3 and 4 show that the underside of the upper part 14 of the cover 13 is provided with several circumferentially extending annular projections in the form of ribs including an innermost rib 21, an outermost rib 23 and an intermediate rib 22. The innermost rib 21 is disposed beneath the intermediate portion 18 (namely at the convex underside of the intermediate portion 18), and the ribs 22, 23 are disposed at the underside of the flange 19 and are spaced apart from the rim 20. The annular space between the two ribs 21 and 23 serves for reception of the adjacent topmost portion 55 (see FIG. 8) of the lower part 15 of the cover 13. The topmost portion 55 of the lower part 15 can be fixedly connected (e.g., glued or welded, preferably ultrasonically welded) to the flange 19 between the ribs 21 and 23. The median rib 22 serves to adequately center the topmost portion 55 relative to the upper part 14 preparatory to and during bonding of the parts 14, 15 to each other.

The lower part 15 of the housing 13 is also made of a single piece of suitable plastic material and includes an extension 24 (see particularly FIGS. 5, 6, 8 and 9) which projects downwardly toward the compartment 54 of the housing 58 when it is properly inserted into the opening 38. The extension 24 has a flat disc-shaped top wall 25 and an arcuate skirt 26 which projects downwardly toward the compartment 54 in properly inserted position of the cover 13 and its parts 14, 15. The skirt 26 has arcuate liquid evacuating apertures 60, and these apertures are disposed diametrically opposite each other. In the embodiment of the lower part 15 which is shown in FIGS. 5 to 9, the apertures 60 have identical widths (as measured in the circumferential direction of the lower part 15 and the top wall 25 of its extension 24). The top wall 25 has two ramps 28 which are inwardly adjacent the apertures 60. The top wall 25 is disposed above and the skirt 26 extends around an interval space 24a which communicates with the opening 38 (i.e., with the compartment 54) and with the apertures 60.

The top wall 25 is axially offset from a round washer-like portion or wall 30 which has a flat lower surface 30a facing the extension 24 and a flat upper surface 31 facing toward the top portion 55 of the lower part 15. An axially extending cylindrical portion 27a of the lower part 15 extends between the walls 25, 30 and is surrounded by a ring-shaped groove 29 for an annular sealing element 61 (indicated in FIG. 6 by phantom lines). The internal surface of the sealing element 61 is or can be cylindrical and abuts the external surface of the axially extending portion 27a. The peripheral surface of the sealing element 61 slopes radially outwardly from the top wall 25 toward the wall 30 and is engaged by the adjacent wall 40 (see FIG. 10) of the housing 58 when the extension 24 of the cover 13 is properly inserted into the opening 38 and the free end of one of the longer lines LL on the flange 19 is adjacent the spout 12 (i.e., in the second position of the cover 13).

The axially extending portion 27a of the lower part 15 of the cover 13 surrounds a socket or recess 27 which extends to the upper side of the top wall 25 and is open at the level of the wall 30, namely at the level of the flat upper surface 31 of the wall 30. The means for separably coupling the lower part 15 of the cover 13 to the housing 58 of the jacket of the carafe 10 and for moving the cover 13 up and down relative to the top section 11 comprises a bayonet mount having its female coupling elements in the lower part 15 and its male coupling elements on the housing 58. Each female coupling element includes two inclined grooves 35, 36 (see particularly FIG. 8) which are provided in the peripheral surface 46 of a substantially cylindrical portion 130 of the lower part 15. The portion 130 is adjacent the wall 30 and extends beyond the upper surface 31. The grooves 35, 36 of each female coupling element communicate with a centrally located inlet 34 extending from the respective grooves 35,36 to the periphery of the lower surface 30a of the wall 30. The grooves 35, 36 of each female coupling element of the bayonet mount are disposed in a plane which makes with the axis of the lower part 15 an oblique angle so that the grooves 35, 36 can be said to constitute portions of a helical groove in the peripheral surface 46 of the cylindrical portion 130 of the lower part 15. Each groove 35 is shorter than the respective groove 36. The grooves 35 extend along angles alpha, and the grooves 36 extend along angles beta. When the male coupling elements or bayonets 44 (FIGS. 10, 11) of the bayonet mount are caused to enter the respective female coupling elements by way of the corresponding inlets 34, the cover 13 can be rotated in a direction to ensure that the male coupling elements 44 are received in the closed ends of the shorter grooves 35 (this is the pouring or raised position of the cover 13) or that the male coupling elements are received in the closed ends of the grooves 36 (this is the sealing or lowered (second) position of the cover 13).

The lower surface 30a of the washer-like portion 30 of the lower part 15 of the cover 13 is provided with a substantially radially extending aerating channel 37 (see FIGS. 5 and 9). One end of the channel 37 communicates with one of the inlets 34, i.e., with one of the female coupling elements forming part of the bayonet mount, and the other end of the channel 37 extends to the bottom of the groove 29.

The wall 30 of the lower part 15 of the cover 13 has two ramps 32 which are outwardly adjacent the ramps 28 of the top wall 25 and are flanked by cam faces 33 merging gradually into the surface 30a. The length of the ramps 32 (in the circumferential direction of the cylindrical portion 130) exceeds the length of the ramps 28 and can equal the width of a passage 56 in a wall 47 of the top section 11. The purpose of the ramps 28 and 32 is to even more reliably ensure predictable dispensing of liquid from the compartment 54 by way of the opening 38, internal space 24a, selected aperture 60, passage 56 and spout 12 when the cover 13 is moved to the pouring position in which the underside of the flange 19 is raised above and away from the upper side of the wall 47 and the sealing element is disengaged from the wall 40. The provision of several ramps in series (one behind the other, as seen in the direction of outflow of liquid) has been found to be especially satisfactory for predictable splash-free dispensing along the predetermined path, i.e., between the sidewalls 41 of the spout 12. The cam faces 33 define boundaries to confine the liquid to the flow from the ramp 32 which is inwardly adjacent the spout 12 only toward and into the passage 56, i.e., the stream of liquid is prevented from flowing off such ramp 32 in the circumferential direction of the wall 30 which would enable the liquid to issue from the carafe at the outer sides of the sidewalls 41.

The entire housing 58 can be made of a single piece of plastic material (even though it is possible to make the housing 58 at least in part of a metallic material, e.g., for decorative purposes in a manner as in the aforementioned jacket No. 279 which is made mainly of stainless steel and has a plastic trim). The main portion 58a of the housing 58 has a relatively large diameter which can considerably exceed that of the top section 11 beneath the spout 12. As already mentioned above, the lower portion of the housing 58 has an internal thread 53 which can mate with the external thread of the bottom wall 59 (shown in FIG. 1) when the carafe 10 is fully assembled, i.e., when the compartment 54 receives a receptacle for a hot or cold beverage, e.g., hot tea or coffee, iced tea or coffee, hot water or cold water. It is clear that the threaded connection between the housing 58 and the bottom wall 59 can be replaced with another suitable connection, e.g., with a bayonet mount, without departing from the spirit of the invention. The bottom wall 59 is detached prior to insertion or withdrawal of the receptacle and is reinserted into the housing 58 upon insertion of the receptacle into the compartment 54 or when the jacket of the carafe 10 is to be put to storage or elsewhere while the compartment 54 remains empty.

The opening 38 of the housing 58 has a circular outline (see FIG. 11) and is surrounded by a relatively short cylindrical collar or wall 39 which merges into an upwardly and outwardly sloping funnel-shaped (frustoconical) wall 40 of the top section 11. The extension 24 of the lower part 15 of the cover 13 extends into the wall 39 when the cover 13 is properly installed in the housing 58. The frustoconical exposed surface of the funnel-shaped wall 40 is engaged by the complementary frustoconical external surface of the sealing element 61 in the groove 29 of the lower portion 15 when the cover 13 (in its second position) seals the opening 38 from the surrounding atmosphere.

The funnel-shaped wall 40 is disposed at a level below an upwardly extending cylindrical wall 45 which has two projections or prongs 44 disposed diametrically opposite each other and constituting the aforementioned male coupling elements of the bayonet mount which separably couples the cover 13 to the housing 58. The inclination of the male coupling elements 44 with reference to a plane which is normal to the axis of the cylindrical wall 45 is identical with or similar to the inclination of grooves 35, 36 of female coupling elements in the external peripheral surface 46 of the cylindrical portion 130 of the lower part 14 to the axis of the cover 13. The length of each male coupling element 44 (in the circumferential direction of the peripheral surface 46) is somewhat less than the width of the inlets 34 so as to ensure that the male coupling elements 44 can be introduced into the corresponding female coupling elements by way of the inlets 34 and can be thereupon caused to enter the respective grooves 35 or 36, depending upon whether the operator wishes to move (raise or lower) the cover 13 to the pouring position or to the second or sealing position. The upper end of the cylindrical wall 45 of the top section 11 is adjacent the outwardly and upwardly flaring frustoconical wall 47 which is interrupted (note the passage 56) in the region of the spout 12. The inclination of the frustoconical wall 47 preferably matches or closely approximates that of the outer side or underside of the flange 19 on the upper part 14 of the cover 13. The width of the passage 56 in the wall 47 (as measured in the circumferential direction of the wall 47) determines the rate of flow of a beverage from the compartment 54 into the spout 12. The passage 56 can be said to constitute a gap in the wall 47, and such gap is flanked by two mutually inclined sidewalls 41 (see particularly FIG. 11) which form part of the spout 12 and slope toward each other in a direction radially outwardly, i.e., away from the wall 47. The radially outermost portions of the sidewalls 41 define a pouring outlet 42 for the outflowing beverage.

Figure 10:
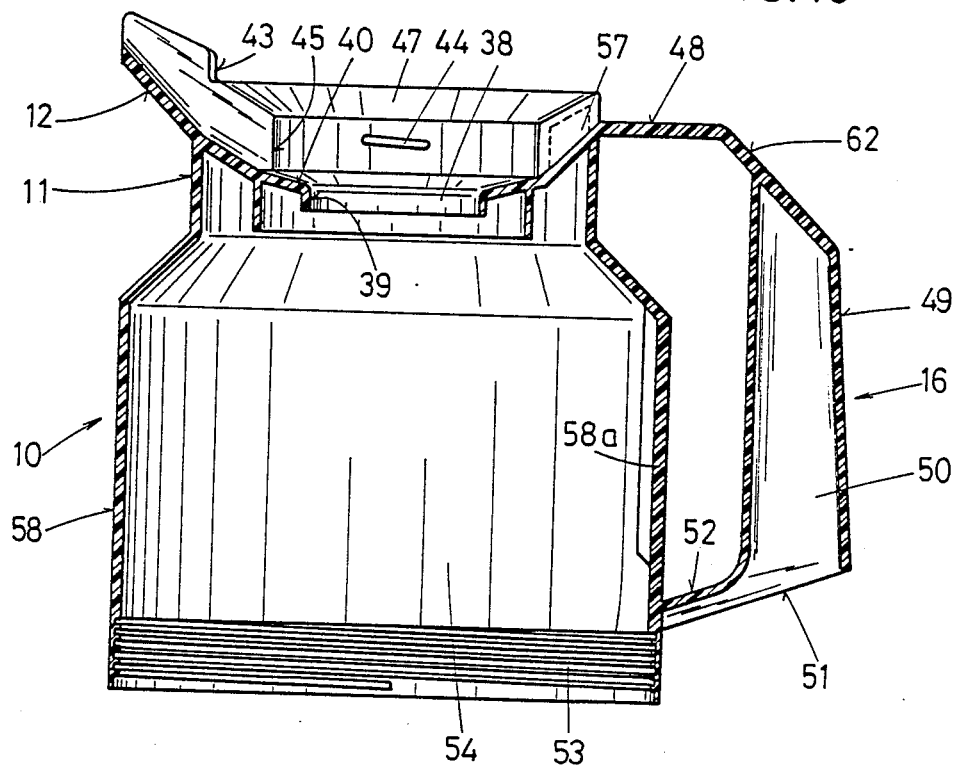
FIG. 10 is a central sectional view of the jacket of the vacuum bottle, with the closure and the bottom wall omitted.
Figure 11:
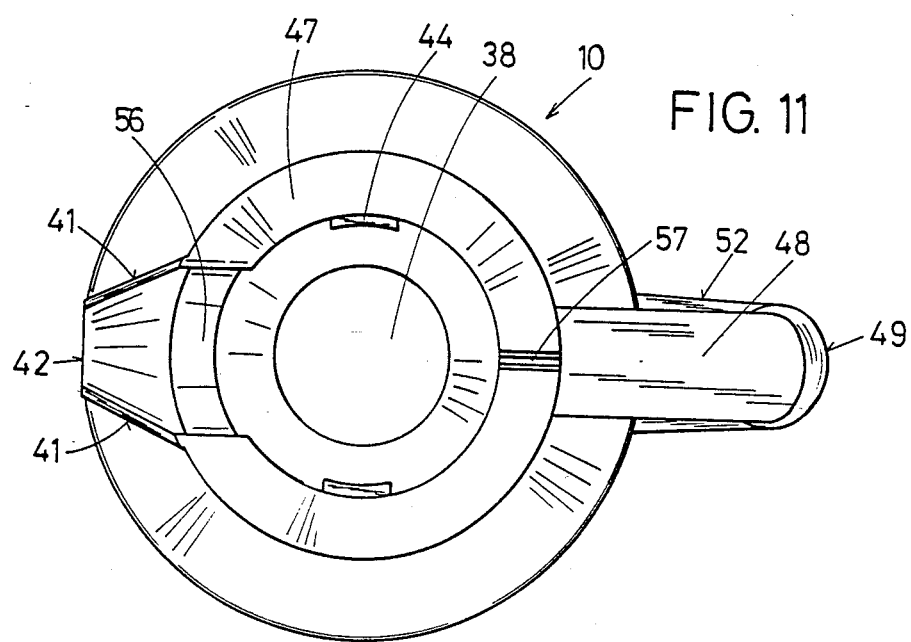
FIG. 11 is a plan view of the structure which is shown in FIG. 10.

As can be seen in FIG. 10, the radially innermost portions of the sidewalls 41 of the spout 12 define shoulders 43 which face toward the center of the housing 58 and abut the adjacent portions of the rim 20 of the flange 19 when the extension 24 of the cover 13 is properly inserted into the opening 38.

FIG. 10 shows that the handle 16 of the illustrated jacket constitutes an integral part of the housing 58. This handle has a substantially horizontal upper portion 48 which extends radially of the housing 58 and merges into the adjacent part of the top section 11, and a substantially horizontal lower portion 52 which merges into the housing 58 adjacent the internal threads 53. The substantially vertical portion 49 of the handle 16 is hollow; its cavity 50 is sealed at the top beneath the upper portion 48 and its cross-sectional area increases in a direction toward the lower portion 52 where it has an open end 51. The means for sealing the top of the cavity 50 includes a downwardly and outwardly sloping facet 62 of the handle 16 radially outwardly of the upper portion 48. The facet 62 is a plate whose upper part merges into a similar plate or facet forming part of the upper portion 48 of the handle 16. The facet of the upper portion 48 is an integral outwardly projecting lug of the top section 11 of the housing 58.

The upper side of the frustoconical wall 47 of the housing 58 is formed with a channel or groove 57 which is adjacent the upper portion 48 of the handle 16, i.e., the channel 57 is disposed diametrically opposite the spout 12 and is open from above and at each of its ends (i.e., adjacent the handle 16 and radially inwardly of the handle close to the funnel-shaped wall 40). The channel 57 can receive a cord or string for a tea bag if the receptacle in the compartment 54 contains a supply of hot water which is to be contacted by tea leaves. The cord or string in the channel 57 does not interfere with rotation of the cover 13 to a selected one of its three positions, namely the pouring (raised) position, the sealing or second position and the position for removal of the extension 24 of the cover 13 from the opening 38.

An important advantage of the improved cover 13 is that it contributes to more predictable flow of liquid into the spout 12 when the carafe 10 is tilted so that liquid can flow by gravity from the receptacle in the compartment 54 toward and into the spout. One of the reasons for more predictable dispensing is the absence of a sickle-shaped gap between the cover 13 and the top section 11 when the cover is caused to assume the pouring position (in which the male coupling elements 44 of the bayonet mount are received in the closed ends of the respective short grooves 35). Moreover, the rate of outflow of liquid is less dependent upon the extent to which the male coupling elements 44 have been advanced toward the closed ends of the respective grooves 35. When in the pouring position, the cover 13 defines with the top section 11 of the housing 58 a path of predetermined cross-sectional area, and such path leads solely to the space between the sidewalls 41 of the spout 12 to thus prevent the outflowing liquid from issuing at the one and/or other side of the spout.

Another important advantage of the cover 13 is that its parts 14 and 15 can be mass produced in available machines at an extremely low cost and from readily available materials. As mentioned above, not only the relatively simple upper part 14 but also the somewhat more complex lower part 15 of the cover 13 can be made of a single piece of suitable plastic material. The extension 24 can be formed in an extruding, injection molding or other suitable machine simultaneously with the wall 30 and cylindrical portion 130.

The axial length of the skirt 26 on the extension 24 is preferably selected in such a way that the skirt continues to extend into the opening 38 of the top section 11 of the housing 58 when the cover 13 is caused to assume its pouring position. This ensures that the liquid, which enters the space 24a in response to tilting of the housing 58 so as to move the spout 12 to a lower level, is compelled to flow only through that aperture 60 which is adjacent the spout 12 to thereupon flow along the corresponding ramp 28 toward and along the respective ramp 32 (only between the respective cam faces 33) on its way toward and into the passage 56. The walls of the entire cover 13 as well as of the top section 11 can be thin, or even extremely thin, because they are not called upon to stand pronounced mechanical stresses.

It would suffice to provide the skirt 26 of the extension 24 with a single aperture 60. The illustrated design with two identical apertures 60 which are disposed diametrically opposite each other is preferred at this time because the cover 13 can be properly coupled to or detached from the top section 11 in either of two different positions at an angle of 180 degrees from each other. Of course, only one of the apertures 60, only one of the ramps 28 and only one of the ramps 32 is in actual use when the person in charge is in the process of pouring a hot or cold beverage from the receptacle in the compartment 54 of the housing 58. Thus, the aperture 60 which is adjacent the upper portion 48 of the handle 16 is not in use. In fact, even if the liquid would reach the aperture 60 next to the handle 16, such liquid would flow downwardly toward, into and through the aperture 60 which is adjacent the spout 12, i.e., there is no spilling of liquid laterally beyond the lower of the two apertures 60. The skirt 26 effectively directs liquid into the aperture 60 which is adjacent the spout 12.

The elasticity of the material of the sealing element 61 is selected in such a way that the element 61 can expand while sliding around the skirt 26 of the extension 24 on its way toward and into the groove 29 between the walls 25 and 30. The properly inserted sealing element 61 contacts the external surface of the cylindrical portion 27a, and the element 61 then extends radially outwardly beyond the groove 29 so that it can properly engage the wall 40 of the top section 11 in the second or sealing position of the cover 13.

The purpose of the aerating channel 37 is to permit escape of air or vapors, for example, water vapors if the carafe 10 contains hot water, hot tea or hot coffee.

The entire cover 13 can be made of a single piece of suitable plastic material. It is presently preferred to make the cover 13 of two parts (14 and 15) which are thereupon bonded to each other so that the rib 23 of the flange 19 surrounds and the rib 21 of the intermediate portion 18 of the upper part 14 is surrounded by the topmost portion 55 of the lower part 15. It is not absolutely necessary to bond (e.g., ultrasonically weld) the lower part 15 to the upper part 14. It is even possible to provide a separable connection between such parts. The concave upper side of the intermediate portion 18 of the upper part 14 of the cover 13 can serve to gather droplets which accumulate in the region of the sidewalls 41 while a stream of liquid issues from the outlet 42 of the spout 12. When the pouring of liquid is completed, such droplets flow along the upper side of the flange 19 and gather at the concave upper side of the portion 18.

The purpose of the sidewalls 41 (which converge toward each other radially of and away from the cover 13) is to further enhance the predictability of the flow of liquid toward and through the outlet 42 of the spout 12. The outlet 42 is relatively narrow (it can be much narrower than the passage 56). As can be seen in FIG. 10, the sidewalls 41 can extend upwardly well beyond the wall 47 of the top section 11.

The male coupling elements 44 of the bayonet mount are rather short, i.e, it is not necessary to provide the wall 45 of the top section 11 with one or more circumferentially complete helices. The length of the elements 44 is selected in such a way that these elements can readily enter (preferably with at least some play) the inlets 34 of the adjacent female coupling elements in the peripheral surface 46 of the cylindrical portion 130.

The inclination of the wall 47 preferably matches the inclination of the flange 19 so that the flange 19 lies flush against the wall 47 in the second or sealing position of the cover 13 and is parallel to the wall 47 when the cover is held in the pouring position.

It is possible to provide the housing 58 with a solid handle. A hollow handle is preferred in many instances because it contributes to savings in material and to a reduction of overall weight of the housing. Moreover, the plastic material sets more rapidly if the handle 16 constitutes a thin-walled component of the housing 58. The aforediscussed configuration of the cavity 50 (whose cross-sectional area increases in a direction from the facet 62 toward the open end 51) is desirable and advantageous because this facilitates removal of the hardened housing 58 from the mold. The illustrated configuration of the facets 62, 48 ensures that the handle 16 assumes a desirable ergonometric shape.

The channel 57 for the cord or string of a tea bag is preferably open at its inner and outer ends. This channel is provided in the cylindrical wall 45 and can extend all the way from the wall 47 to the wall 40 and is adjacent the upper portion 48 of the handle 16. It has been found that a cord or string in the channel 57 does not interfere with attachment of the cover 13 to or with separation of the cover from the top section 11 and/or with rotation of the cover between its pouring and sealing positions.

The improved carafe is susceptible of many additional modifications. For example, the configuration of the upper part 14 and/or lower part 15 of the cover 13 can depart from those which are respectively shown in FIGS. 2 to 4 and 5 to 9. Furthermore, the housing 58 can have a polygonal or oval shape, and its height may considerably exceed its maximum diameter. The configuration of the extension 24 can also depart from that which is shown in FIGS. 5, 6, 8 and 9. For example, the width of the liquid-discharging apertures 60 can vary within a wide range, and the same holds true for the axial length of the peripheral surface 46.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A vessel for hot or cold beverages, particularly a vacuum bottle, comprising a housing defining a liquid-receiving compartment and having a bottom wall beneath and a top section above said compartment, said top section having an opening communicating with said compartment and a spout; and a cover overlying said opening and including an extension in said opening, said extension having an internal space communicating with said compartment and at least one lateral liquid-evacuating aperture communicating with said space, said extension including a top wall disposed above said space and having a first ramp adjacent said aperture, said extension being rotatable in said opening between a pouring position in which said aperture establishes a path for the flow of liquid from said compartment into said spout and a second position in which said extension seals the spout from said compartment, said cover further comprising a substantially washer-like portion spaced apart from and disposed above said top wall, said washer-like portion having a second ramp disposed radially outwardly of said first ramp.

2. The vessel of claim 1, wherein said washer-like portion has a substantially plane surface confronting said extension and cam faces flanking said second ramp and merging into said plane surface.

3. The vessel of claim 1, wherein said cover has an external circumferential groove adjacent and disposed above said top wall, and further comprising an annular sealing element provided in said groove and engaging said top section in the second position of said extension.

4. The vessel of claim 1, wherein said extension has an open underside facing said bottom wall and further comprising means for releasably and rotatably coupling said cover to said top section.

5. The vessel of claim 4, wherein said coupling means comprises a bayonet mount.

6. The vessel of claim 1, wherein said cover further comprises a second wall spaced apart from and disposed above said top wall, said second wall having a surface confronting said extension and an aerating channel in said surface.

7. The vessel of claim 6, wherein said channel extends substantially radially of said extension.

8. The vessel of claim 1, wherein said top section has a channel for the cord of a tea bag extending into said compartment.

9. The vessel of claim 8, wherein said top section includes an outwardly and upwardly flaring wall having an upper side and said channel is provided in said upper side.

10. The vessel of claim 8, wherein said housing comprises a handle which is disposed opposite said spout, said handle having an upper portion adjacent said channel.

11. The vessel of claim 1, wherein said housing includes a main portion between said bottom wall and said top section, and a handle adjacent said main portion and including substantially horizontal upper and lower portions and a substantially vertical portion between the upper and lower portions.

12. The vessel of claim 11, wherein said vertical portion has a cavity with an open lower end.

13. The vessel of claim 12, wherein the cross-sectional area of said cavity diminishes in a direction from said open lower end toward the upper portion of said handle.

14. The vessel of claim 12, wherein the vertical portion of said handle has an inclined first facet above said cavity and the upper portion of said handle has a second facet which is inclined relative to and integral with said first facet.

15. The vessel of claim 1, wherein said extension further includes a skirt surrounding said space, said at least one aperture being provided in said skirt.

16. The vessel of claim 15, wherein said skirt has two apertures which are disposed substantially diametrically opposite each other with respect to the axis of rotation of said extension.

17. The vessel of claim 16, wherein said apertures are identical.

18. A vessel for hot or cold beverages, particularly a vacuum bottle, comprising a housing defining a liquid-receiving compartment and having a bottom wall beneath and a top section above said compartment, said top section having an opening communicating with said compartment, a spout, an annular first wall surrounding said opening, an upwardly and outwardly flaring second wall adjacent and disposed above said first wall, and a substantially cylindrical third wall adjacent and disposed above said second wall; a cover overlying said opening and including an extension in said opening, said extension having an internal space communicating with said compartment and at least one lateral liquid-evacuating aperture communicating with said space, said extension being rotatable in said opening between a pouring position in which said aperture establishes a path for the flow of liquid from said compartment into said spout and a second position in which said extension seals the spout from said compartment; and means for rotatably and releasably coupling said cover to said top section, said coupling means comprising a bayonet mount having two male coupling elements provided on said third wall and being disposed substantially diametrically opposite each other.

19. The vessel of claim 18, wherein said male coupling elements are elongated protuberances which are inclined to the horizontal.

20. The vessel of claim 19, wherein said top section further comprises a fourth wall which is adjacent and slopes upwardly and outwardly from the upper end of said third wall, said fourth wall having a passage adjacent said spout and communicating with said aperture in the pouring position of said extension.

21. The vessel of claim 20, wherein said cover further comprises a flange which overlies said fourth wall and is spaced apart from said fourth wall in the pouring position of said extension so that liquid can flow from said aperture into said passage in response to tilting of said housing so as to move the spout to a lower level.

22. The vessel of claim 18, wherein said cover comprises a lower part which includes said extension and an upper part which is rigid with said lower part, said lower part further including a substantially cylindrical portion having a peripheral surface provided with female coupling elements for said male coupling elements.

23. The vessel of claim 22, wherein each of said female coupling elements includes an inlet for the respective male coupling element and first and second grooves which are inclined to the horizontal and communicate with the respective inlet.

24. The vessel of claim 23, wherein the first groove of each of said female coupling elements is shorter than the second groove, said male coupling elements being received in one of the respective grooves in the pouring position and in the other of the respective grooves in the second position of said extension.

25. The vessel of claim 24, wherein said one groove of each female coupling element extends circumferentially of said extension and clockwise from the respective inlet along an arc of approximately 40 degrees and the other groove of each female coupling element extends along an arc of approximately 70 degrees counterclockwise from the respective inlet.

26. A vessel for hot or cold beverages, particularly a vacuum bottle, comprising a housing defining a liquid-receiving compartment and having a bottom wall beneath and a top section above said compartment, said top section having an opening communicating with said compartment and a spout; and a rotary cover overlying said opening and including an upper part accessible above said top section to facilitate rotation of said cover and a lower part rigid with said upper part and including an extension in said opening, said extension having an internal space communicating with said compartment and at least one lateral liquid-evacuating aperture communicating with said space, said extension including a top wall above said space and said extension being rotatable in said opening between a pouring position in which said aperture establishes a path for the flow of liquid from said compartment into said spout and a second position in which said extension seals said spout from said aperture, said lower part further comprising a substantially cylindrical portion which is disposed above said extension and said upper part including two annular projections one of which surrounds and the other of which is surrounded by said cylindrical portion.

27. The vessel of claim 26, wherein said cylindrical portion is bonded to said upper part.

28. The vessel of claim 27, wherein said cylindrical portion is welded to said upper part.

29. The vessel of claim 26, wherein said upper part comprises a dome-shaped upwardly extending central portion which is rotatable by hand to thereby rotate said extension between said positions.

30. The vessel of claim 29, wherein said upper part is a one-piece body and further comprises an annular flange surrounding said central portion and an intermediate portion connecting said central portion with said flange, said flange having a rim remote from said intermediate portion.

31. The vessel of claim 30, wherein said spout has sidewalls defining shoulders which abut said rim.

32. The vessel of claim 31, wherein said sidewalls converge in a direction radially of and away from said extension.

33. The vessel of claim 32, wherein said sidewalls define an outlet for outflow of liquid from said spout.

* * * * *